US012220722B2

(12) United States Patent
Hojo

(10) Patent No.: US 12,220,722 B2
(45) Date of Patent: Feb. 11, 2025

(54) COATING DIE AND COATING DEVICE

(71) Applicant: Panasonic Intellectual Property Management Co., Ltd., Osaka (JP)

(72) Inventor: Satoaki Hojo, Osaka (JP)

(73) Assignee: Panasonic intellectual Property Management Co., Ltd., Osaka (JP)

( * ) Notice: Subject to any disclaimer, the term of this patent is extended or adjusted under 35 U.S.C. 154(b) by 556 days.

(21) Appl. No.: 17/418,162

(22) PCT Filed: Nov. 20, 2019

(86) PCT No.: PCT/JP2019/045507
§ 371 (c)(1),
(2) Date: Jun. 24, 2021

(87) PCT Pub. No.: WO2020/137273
PCT Pub. Date: Jul. 2, 2020

(65) Prior Publication Data
US 2022/0055062 A1  Feb. 24, 2022

(30) Foreign Application Priority Data
Dec. 26, 2018  (JP) .................................. 2018-242383

(51) Int. Cl.
*B05C 5/02* (2006.01)
*H01M 4/04* (2006.01)

(52) U.S. Cl.
CPC ............. *B05C 5/02* (2013.01); *B05C 5/0254* (2013.01); *H01M 4/0404* (2013.01); *Y02E 60/10* (2013.01)

(58) Field of Classification Search
None
See application file for complete search history.

(56) References Cited

U.S. PATENT DOCUMENTS

| 6,057,000 | A | * | 5/2000 | Cai | ....................... B05C 5/0254 118/410 |
| 6,312,758 | B1 | * | 11/2001 | Sato | ....................... B05C 5/0254 118/410 |
| 2014/0331923 | A1 | * | 11/2014 | Kim | ....................... B05C 5/0254 118/324 |

FOREIGN PATENT DOCUMENTS

| CN | 103962265 A | 8/2014 |
| JP | H09-109229 A | 4/1997 |
| JP | H09-225990 A | 9/1997 |

(Continued)

OTHER PUBLICATIONS

International Search Report issued in corresponding International Patent Application No. PCT/JP2019/045507, dated Dec. 17, 2019, with English translation.

*Primary Examiner* — Binu Thomas
(74) *Attorney, Agent, or Firm* — Rimon P.C.

(57) ABSTRACT

A coating die includes a manifold, a supply port, a discharge port, a supply passage, and a discharge passage. The manifold, the discharge passage, and the discharge port are longer in a first direction, and an outline of the manifold viewed from a second direction includes a first outline part to which the discharge passage is connected and also includes a second outline part located opposite the first outline part. The second outline part includes a first taper part tilted to be closer to the first outline part toward an end of the manifold. When the dimension in the first direction from a connection part at which the supply passage is connected in the manifold to the end is set to 1, dimension ratio of the first taper part in the first direction is 0.4 or less.

6 Claims, 7 Drawing Sheets

(56) References Cited

FOREIGN PATENT DOCUMENTS

| | | | |
|---|---|---|---|
| JP | 2010-108678 A | | 5/2010 |
| JP | 2014229343 A | * | 12/2014 |
| JP | 2015-188852 A | | 11/2015 |
| JP | 2016073951 A | * | 5/2016 |
| JP | 2018-069529 A | | 5/2018 |

* cited by examiner

FIG. 5

| WHETHER OR NOT FIRST TAPER PART IS PROVIDED | NOT PROVIDED | PROVIDED | | | | | | |
|---|---|---|---|---|---|---|---|---|
| DIMENSION RATIO m | 0 | 0.03 | 0.06 | 0.125 | 0.25 | 0.4 | 0.5 | 1 |
| FLOW RATE DIFFERENCE $\Delta V(m)$ [%] | 1.20 | 1.13 | 1.08 | 1.00 | 1.00 | 1.19 | 1.40 | 2.64 |
| ACCUMULATION REGION RATIO $R(m)$ [%] | 0.88 | 0.37 | 0.24 | 0.14 | 0.08 | 0.06 | 0.05 | 0.02 |
| REDUCTION OF ACCUMULATION REGION RATIO $\alpha(m)$ [%] | — | −58.2 | −73.0 | −84.1 | −90.5 | −93.3 | −94.5 | −97.7 |
| VARIATION OF ACCUMULATION REGION RATIO $\theta(m)$ [°] | — | −83.5 | −73.1 | −44.4 | −16.0 | −7.5 | −5.6 | −2.5 |

COATING DIE AND COATING DEVICE

CROSS-REFERENCE TO RELATED APPLICATIONS

This application is the U.S. National Phase under 35 U.S.C. § 371 of International Patent Application No. PCT/JP2019/045507, filed on Nov. 20, 2019, which in turn claims the benefit of Japanese Patent Application No. 2018-242383, filed on Dec. 26, 2018, the entire content of each of which is incorporated herein by reference.

BACKGROUND

Field of the Invention

The present disclosure relates to a coating die and a coating device.

Description of the Related Art

In recent years, with widespread use of electric vehicles (EV), hybrid vehicles (HV), and plug-in hybrid vehicles (PHV), for example, shipment of secondary batteries has been increasing. Particularly, lithium-ion secondary batteries are increasingly shipped. A general secondary battery mainly includes a positive plate, a negative plate, a separator, and an electrolyte as constituting elements. An electrode plate, such as the positive plate or negative plate, has a structure in which an electrode active material is laminated on a surface of a current collector made of metallic foil.

As a method for manufacturing such an electrode plate, a method has been conventionally known in which electrode slurry is intermittently applied on a surface of elongated metallic foil using an intermittent coating device that includes a die used to discharge electrode slurry obtained by mixing an active material and a solvent, and an intermittent valve used to switch supply and non-supply of the electrode slurry to the die (see Patent Literature 1, for example).

Patent Literature 1: Japanese Unexamined Patent Application Publication No. 2010-108678
Patent Literature 2: Japanese Unexamined Patent Application Publication No. 9-109229
Patent Literature 3: Japanese Unexamined Patent Application Publication No. 2018-69529
Patent Literature 4: Japanese Unexamined Patent Application Publication No. 9-225990

In recent years, as a measure to improve the performance of secondary batteries, a number of active materials having different properties have been developed. When electrode slurry is prepared, a dispersant, a binder, a solvent, and the like are optimally selected based on the properties of the active material. For example, for positive electrodes, solvent-based slurry is used in most cases, in consideration of the properties of active materials. Meanwhile, for negative electrodes, water-based slurry is increasingly used, in terms of reduction of environmental load and cost, and improvement of battery performance, for example. When water-based negative electrode slurry is prepared, a thickener, such as carboxymethylcellulose (CMC), is generally used in order to adjust slurry viscosity and to improve active material dispersibility.

Functions of some thickeners are likely to deteriorate depending on the environmental conditions including temperature. Accordingly, in water-based negative electrode slurry, an active material tends to often settle out. Also, in electrode slurry, an active material with a binder, an additive, and the like constitute solid particles, and the specific gravity of the solid particles is generally large with respect to the solvent of the electrode slurry. Accordingly, an active material is likely to settle out also in positive electrode slurry, not only in negative electrode slurry.

In a coating die, an active material is likely to settle out in a region where slurry accumulates in a manifold. When an active material settles out and becomes solidified within the manifold, the active material may act as foreign matter to interfere with uniform coating of a coating material. Such interference in coating may cause inconsistency in coating film thickness or may cause local uncoated areas (streaks). Also, the settling active material may change in properties with time and lose its intrinsic properties; such an active material may be then dispersed in the slurry again and may be applied on a current collector plate. This may cause performance degradation of secondary batteries. Also, since such a settling active material in a manifold cannot be easily removed, maintainability of the coating device is also degraded. Therefore, minimizing settling of an active material within the manifold is desired.

SUMMARY OF THE INVENTION

The present disclosure has been made in view of such a situation, and a purpose thereof is to provide a technology for restraining settling of an active material within a manifold of a coating die.

One embodiment of the present disclosure relates to a coating die. The coating die is used to apply a coating material onto a material to be coated and includes: a manifold that temporarily stores the coating material; a supply port through which the coating material is supplied from the outside to the manifold; a discharge port through which the coating material is discharged from the manifold toward the material to be coated; a supply passage that connects the supply port and the manifold; and a discharge passage that connects the manifold and the discharge port. The manifold, the discharge passage, and the discharge port are longer in a first direction that intersects a discharge direction of the coating material from the discharge port. An outline of the manifold viewed from a second direction that intersects the discharge direction and a first direction includes a first outline part to which the discharge passage is connected and also includes a second outline part located opposite the first outline part. The second outline part includes, in an end region in a first direction, a first taper part tilted to be closer to the first outline part toward an end of the manifold in the first direction. When the dimension in a first direction from a connection part at which the supply passage is connected in the manifold to an end is set to 1, dimension ratio of the first taper part in a first direction is 0.4 or less.

Another embodiment of the present disclosure relates to a coating device. The coating device includes the coating die according to the one embodiment used to apply a coating material onto a material to be coated, and a supply device that supplies the coating material to the coating die. Optional combinations of the aforementioned constituting elements, and implementation of the present disclosure, including the expressions, in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 5 is a diagram that shows relationships between the dimension ratio of a first taper part and each of the flow rate difference, the accumulation region ratio, the reduction of accumulation region ratio, and the variation of accumulation region ratio;

DETAILED DESCRIPTION OF THE INVENTION

Figure 1:
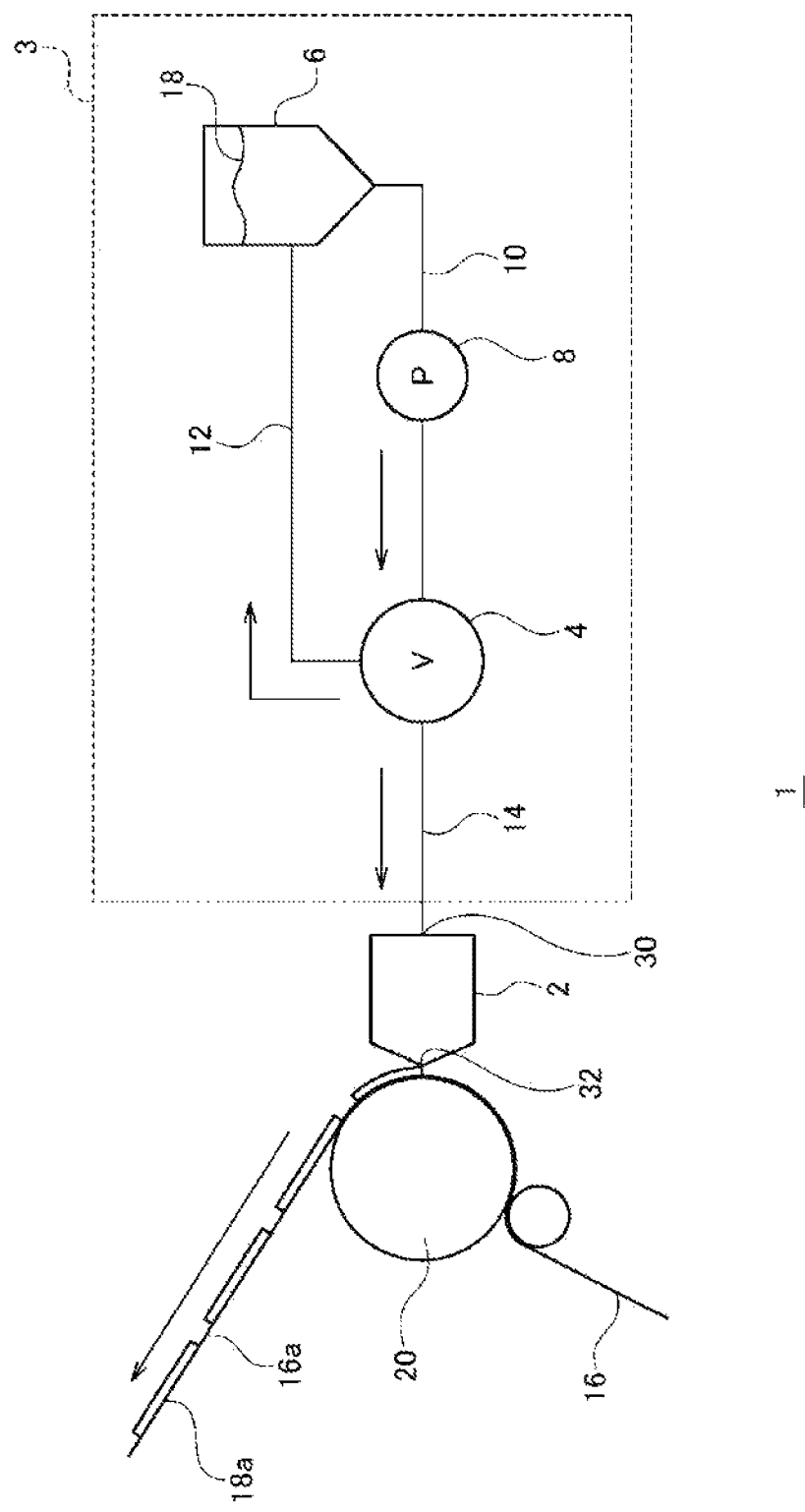
FIG. 1 is a schematic diagram of a coating device according to an embodiment.

In the following, the present disclosure will be described based on a preferred embodiment with reference to the drawings. The embodiment is intended to be illustrative only and not to limit the invention, so that it should be understood that not all of the features or combinations thereof described in the embodiment are necessarily essential to the invention. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. Also, when the terms "first", "second", and the like are used in the present specification or claims, such terms do not imply any order or degree of importance and are used to distinguish one configuration from another, unless otherwise specified. Further, in each drawing, part of a member less important in describing the embodiment may be omitted.

FIG. 1 is a schematic diagram of a coating device according to an embodiment. A coating device 1 includes a coating die 2 and a supply device 3.

The coating die 2 is a tool used to apply a coating material 18 onto a material 16 to be coated. The coating device 1 according to the present embodiment is used to manufacture electrode plates of secondary batteries. An electrode plate of a secondary battery is a sheet electrode material obtained by drying a current collector on which electrode slurry is applied. Accordingly, in the present embodiment, the material 16 to be coated is a current collector of a secondary battery, and the coating material 18 is electrode slurry of a secondary battery. The current collector may be metallic foil, for example. The electrode slurry may be a mixture of a positive-electrode active material or a negative-electrode active material and a solvent or the like, for example. In the case of a general lithium-ion secondary battery, the positive electrode plate is prepared by applying slurry containing a positive-electrode active material, such as lithium cobalt oxide and lithium iron phosphate, onto aluminum foil. Also, the negative electrode plate is prepared by applying slurry containing a negative-electrode active material, such as graphite, onto copper foil.

The coating die 2 is disposed such that a discharge port 32 thereof faces a circumferential surface of a backup roll 20 with a certain space therebetween. The material 16 to be coated is continuously conveyed by means of rotation of the backup roll 20 to the position where the backup roll 20 and the discharge port 32 face each other.

The supply device 3 is a device that supplies the coating material 18 to the coating die 2. The supply device 3 includes an intermittent valve 4, a tank 6, a pump 8, a feed pipe conduit 10, a return pipe conduit 12, and a die supply pipe conduit 14.

To the coating die 2, the intermittent valve 4 is connected via the die supply pipe conduit 14. The die supply pipe conduit 14 is connected at one end to a supply port 30 of the coating die 2 and also connected at the other end to the intermittent valve 4. The intermittent valve 4 is a member that switches supply and non-supply of the coating material 18 to the coating die 2. While the coating material 18 is supplied to the coating die 2, the coating device 1 can discharge the coating material 18 from the coating die 2 onto the material 16 to be coated. To the intermittent valve 4, the tank 6 is connected via the feed pipe conduit 10 and the return pipe conduit 12.

The tank 6 stores the coating material 18. On the feed pipe conduit 10, the pump 8 is provided. With the pump 8 driven, the coating material 18 is fed from the tank 6 to the intermittent valve 4. The intermittent valve 4 supplies the coating material 18 from the tank 6 to the coating die 2 through the die supply pipe conduit 14. Also, the intermittent valve 4 returns the coating material 18 from the tank 6 to the tank 6 through the return pipe conduit 12.

The intermittent valve 4 supplies the coating material 18 to the coating die 2, which discharges the coating material 18, so that an applied part 18a of the coating material 18 can be formed on the material 16 to be coated. Also, the intermittent valve 4 returns the coating material 18 to the tank 6, and the discharge of the coating material 18 from the coating die 2 is stopped, so that an unapplied part 16a of the coating material 18 can be formed on the material 16 to be coated. In other words, with the intermittent valve 4, intermittent coating of the coating material 18 can be performed on the material 16 to be coated. The unapplied part 16a is used for pasting of the center lead of an electrode, for example. The coating performed by the coating device 1 is not limited to intermittent coating.

Figure 2:
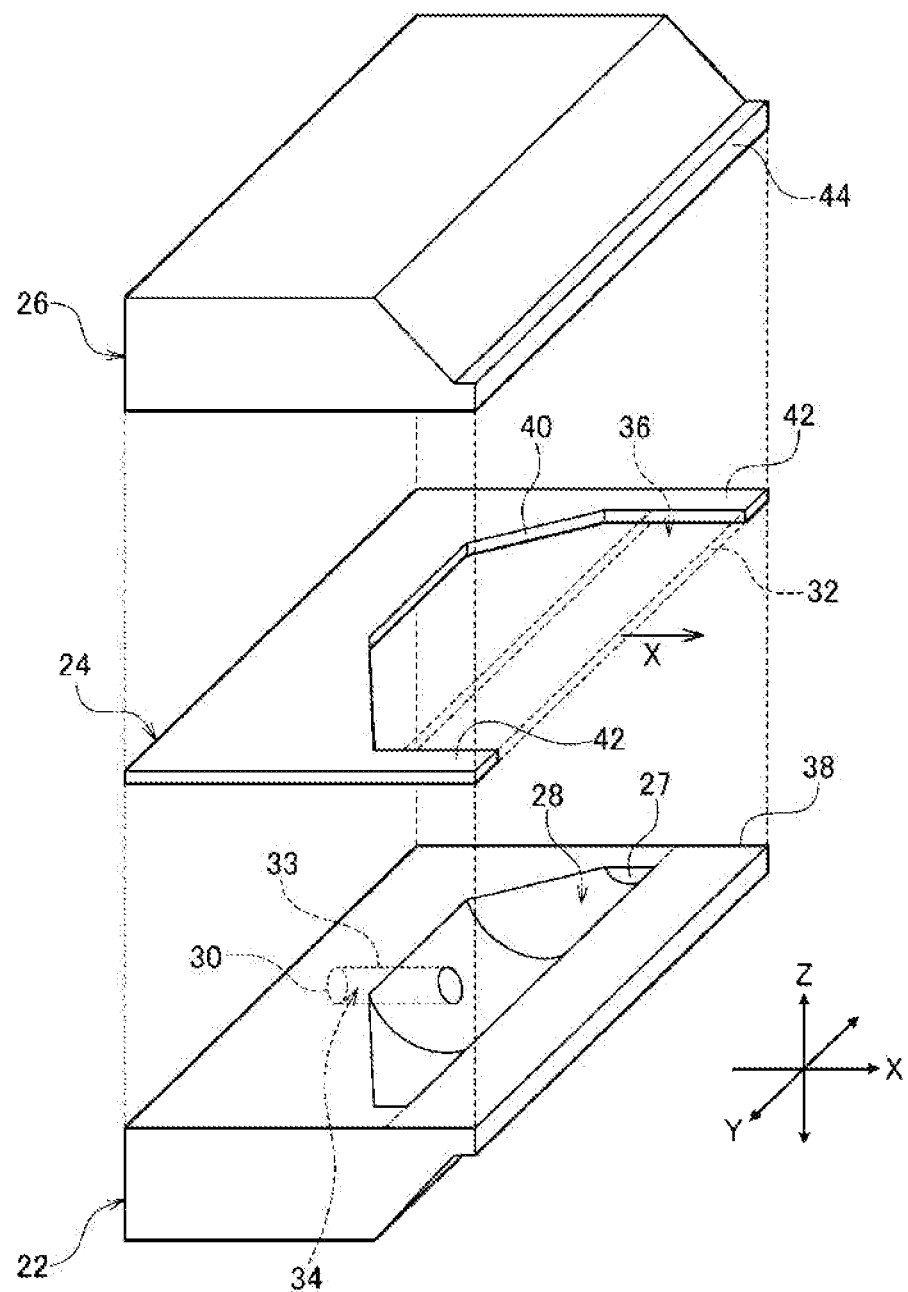
FIG. 2 is an exploded perspective view of a coating die.

FIG. 2 is an exploded perspective view of the coating die 2. The coating die 2 includes a manifold 28, the supply port 30, the discharge port 32, a supply passage 34, and a discharge passage 36. The manifold 28 is space for temporarily storing the coating material 18. The supply port 30 is an opening through which the coating material 18 is supplied from the outside of the coating die 2, i.e., from the supply device 3, to the manifold 28. The discharge port 32 is an opening through which the coating material 18 is discharged from the manifold 28 toward the material 16 to be coated. The supply passage 34 is a flow passage that connects the supply port 30 and the manifold 28. The discharge passage 36 is a flow passage that connects the manifold 28 and the discharge port 32. In the present embodiment, the supply passage 34 is connected to a middle part in a first direction Y of the manifold 28 (see also FIG. 3).

The coating die 2 of the present embodiment has a structure in which a first block 22, a spacer 24, and a second block 26 are laminated in this order. The first block 22 is a member of flat and substantially rectangular parallelepiped shape and is disposed such that one main surface thereof faces the second block 26 side. The first block 22 includes a recess 27 in a center part of the main surface that faces the second block 26 side. The recess 27 constitutes the manifold 28. The recess 27, or the manifold 28, has an elongated shape that is longer in a first direction Y.

Each first direction Y is a direction that intersects a discharge direction X of the coating material 18 from the discharge port 32. Also, a direction that intersects the discharge direction X and a first direction Y is defined as a second direction Z. In the present embodiment, the discharge direction X, a first direction Y, and a second direction Z are perpendicular to each other. Also, each of the discharge direction X and the first directions Y extends horizontally, and each of the second directions Z extends vertically. The first block 22, the spacer 24, and the second block 26 are laminated in a second direction Z.

On an outer side surface of the first block 22, the supply port 30 is provided. To the supply port 30, the die supply pipe conduit 14 is connected. The first block 22 also includes a through hole 33 that communicates with the supply port 30 and the recess 27. The through hole 33 constitutes the supply passage 34. The first block 22 also includes, on the longer side of the recess 27 extending in a first direction Y, a first projecting part 38 that projects in the discharge direction X. The first projecting part 38 is disposed such as to be longer in a first direction Y and to be flush with the main surface on the second block 26 side.

The spacer 24 is a plate material of substantial U-shape that surrounds the three sides of the recess 27 except the first projecting part 38 side, when viewed from a second direction Z. The spacer 24 includes a cutout part 40 in a range that overlaps the recess 27 and a range from the recess 27 to the end of the first projecting part 38 when viewed from a second direction Z. The spacer 24 also includes a pair of arm parts 42 arranged such that the cutout part 40 is located therebetween along a first direction Y. The pair of arm parts 42 form a region from the recess 27 to the end of the first projecting part 38 in the cutout part 40.

As with the first block 22, the second block 26 is also a member of flat and substantially rectangular parallelepiped shape and is disposed such that one main surface thereof faces the first block 22 side. On the main surface of the second block 26, the recess 27 is not provided. The second block 26 includes, at a position overlapping the first projecting part 38 in a second direction Z, a second projecting part 44 that projects in the discharge direction X. The second projecting part 44 is disposed such as to be longer in a first direction Y and to be flush with the main surface on the first block 22 side.

The spacer 24 is provided between the main surface of the first block 22 and the main surface of the second block 26. With the first block 22, the spacer 24, and the second block 26 laminated, the manifold 28, the discharge passage 36, and the discharge port 32 are formed. More specifically, the manifold 28 is formed by the recess 27 of the first block 22, the region overlapping the recess 27 in the cutout part 40 of the spacer 24, and the region overlapping the recess 27 in the main surface of the second block 26. Also, the discharge passage 36 and the discharge port 32 are formed by the first projecting part 38 of the first block 22, the arm parts 42 of the spacer 24, and the second projecting part 44 of the second block 26. Each of the discharge passage 36 and the discharge port 32 has an elongated shape that is longer in a first direction Y. By adjusting the interval between the pair of arm parts 42 along a first direction Y, the dimension of the discharge port 32 in a first direction Y and the width of the applied parts 18a can be changed.

The coating material 18 fed from the supply device 3 enters the coating die 2 through the supply port 30 and flows into the manifold 28 through the supply passage 34. The coating material 18 is temporarily stored in the manifold 28 and then reaches the discharge port 32 through the discharge passage 36 to be discharged through the discharge port 32. The manifold 28 is space having a larger volume than the supply passage 34 or the discharge passage 36. Since the coating material 18 is once stored in the manifold 28 and fed to the discharge port 32 thereafter, the stability of discharging the coating material 18 can be improved.

Figure 3:
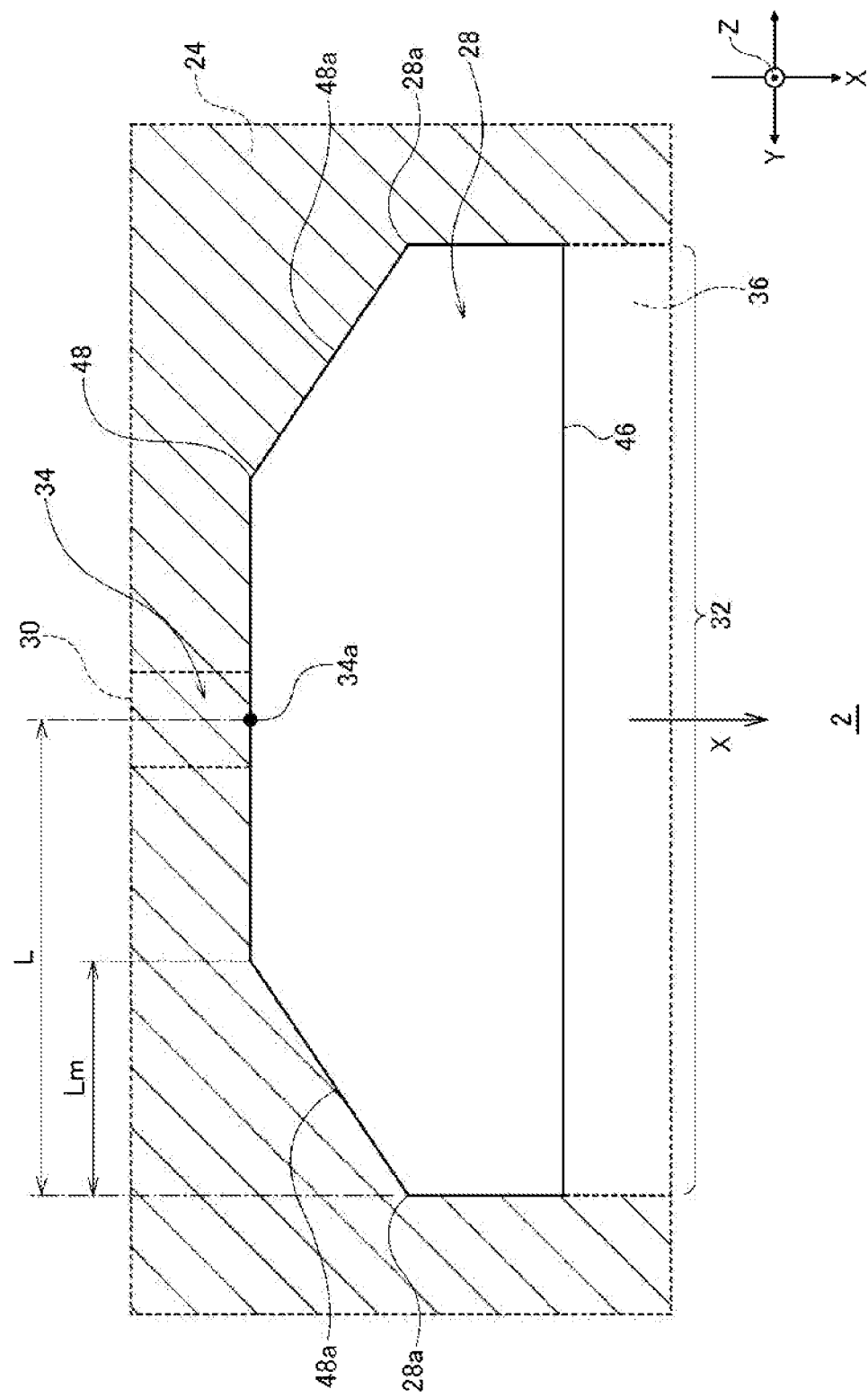
FIG. 3 is a schematic diagram that illustrates an outline of a manifold viewed from a second direction.

FIG. 3 is a schematic diagram that illustrates an outline of the manifold 28 viewed from a second direction Z. In FIG. 3, portions other than the manifold 28 are indicated by dotted lines, for the sake of convenience. The outline of the manifold 28 viewed from the second direction z corresponds to an outer shape of the manifold 28 when the manifold 28 is projected onto an X-Y plane that includes the discharge direction X and a first direction Y.

The outline of the manifold 28 viewed from the second direction Z includes a first outline part 46 to which the discharge passage 36 is connected, and a second outline part 48 located opposite the the first outline part 46. The first outline part 46 and the second outline part 48 are arranged in the discharge direction X. The second outline part 48 includes, in an end region in a first direction Y, a first taper part 48a tilted to be closer to the first outline part 46 toward an end 28a of the manifold 28 in the first direction Y. In other words, the first taper part 48a is tilted to be closer to the discharge passage 36 in the discharge direction X toward the end 28a. In the present embodiment, the end region in a first direction Y is a region including the corresponding end 28a of the manifold 28. Accordingly, one end of the first taper part 48a is positioned at the corresponding end 28a of the manifold 28. In the present embodiment, the first taper part 48a is arranged at each of the both ends of the manifold 28 in a first direction Y.

When the dimension in a first direction Y from a connection part 34a at which the supply passage 34 is connected in the manifold 28 to an end 28a is set to 1, dimension ratio m of a first taper part 48a in a first direction Y is 0.4 or less. In other words, proportion of the length in a first direction of a first taper part 48a to the length in a first direction from the connection part 34a to an end 28a, or proportion of a first taper part 48a in a range from the connection part 34a to an end 28a, is 40% or less. Accordingly, each first taper part 48a is disposed with a certain space from the supply passage 34 in a first direction Y. The connection part 34a may be the middle point in a first direction Y of an end part of the supply passage 34 connected to the manifold 28, for example.

The dimension ratio m of a first taper part 48a is ratio of a dimension Lm in a first direction Y of the first taper part 48a to a dimension L in a first direction Y from an end 28a of the manifold 28 to the connection part 34a. The dimension ratio m is calculated based on Equation 1.

$$m = Lm/L \qquad \text{Equation 1}$$

When m=0, the manifold 28 is a manifold in which the first taper parts 48a are not provided, which corresponds to a conventional manifold.

Figure 4:
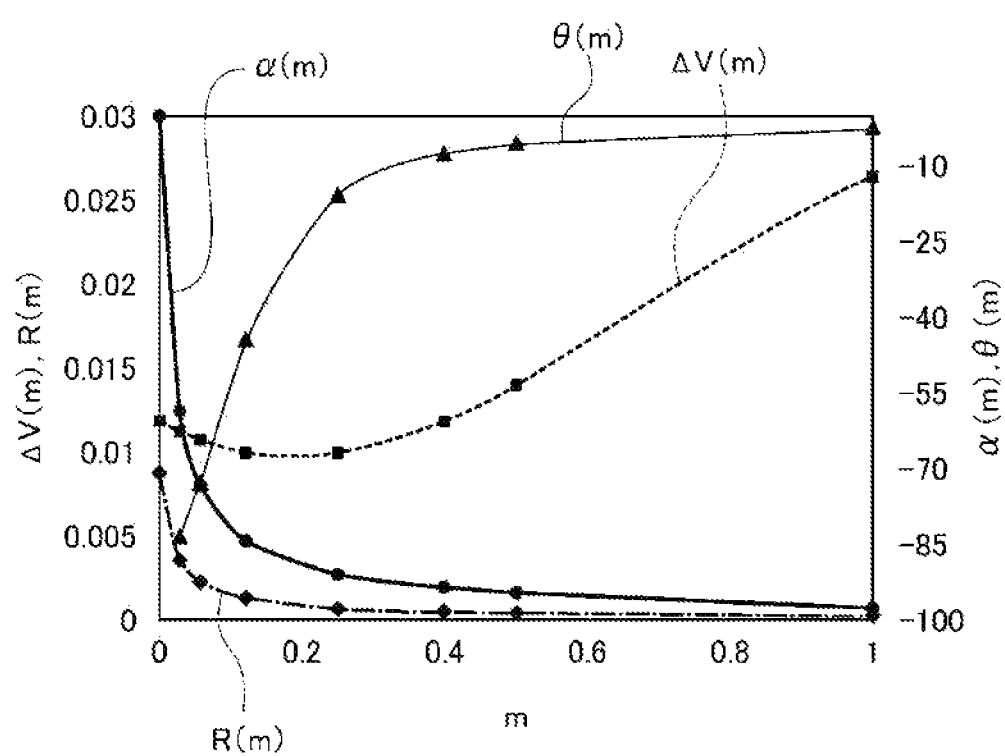
FIG. 4 is a diagram that shows relationships between dimension ratio of a first taper part and each of a flow rate difference, accumulation region ratio, a reduction of accumulation region ratio, and a variation of accumulation region ratio.

FIGS. 4 and 5 are diagrams that each show relationships between the dimension ratio m of a first taper part 48a and each of a flow rate difference, accumulation region ratio, a reduction of accumulation region ratio, and a variation of accumulation region ratio.

A flow rate difference $\Delta V(m)$ is a difference in the flow rate of the coating material 18 at the discharge port 32 in the coating die 2 that includes the first taper parts 48a with the dimension ratio m. Since the discharge port 32 is longer in a first direction Y, a flow rate difference may occur at each region along a first direction Y. The flow rate difference ΔV(m) is calculated based on Equation 2.

$$\Delta V(m) = (V_{max} - V_{min})/V_{ave} \quad \text{Equation 2}$$

In Equation 2, $V_{max}$ is a flow rate value in a region where the flow rate is maximum in the discharge port 32, and $V_{min}$ is a flow rate value in a region where the flow rate is minimum in the discharge port 32. Also, $V_{ave}$ is an average value of flow rates in the entire discharge port 32. The flow rate difference ΔV(m) may be computed based on a result of fluid simulation using fluid analysis software. As the fluid analysis software, widely-used fluid analysis software of ANSYS Fluent (R14) from ANSYS, Inc. or the like may be used. In FIG. 5, the flow rate difference ΔV(m) is expressed in percentage (%).

Accumulation region ratio R(m) is ratio of a volume r(m) of an accumulation region within the manifold 28 to the entire volume R of the manifold 28 in the coating die 2 that includes the first taper parts 48a with the dimension ratio m. The accumulation region ratio R(m) is calculated based on Equation 3.

$$R(m) = r(m)/R \quad \text{Equation 3}$$

The accumulation region is a region in which the flow rate of the coating material 18 is 0.1% or less of the average flow rate $V_{ave}$ in the discharge port 32. The inventor has ascertained that, at least when the flow rate is 0.1% or less, an active material settles out and becomes solidified within the manifold 28. The volume r (m) of an accumulation region may be computed based on a result of fluid simulation using fluid analysis software. In FIG. 5, the accumulation region ratio R(m) is expressed in percentage (%).

A reduction α(m) of the accumulation region ratio is ratio of a change of the accumulation region ratio R(m) in a manifold that includes the first taper parts 48a with the dimension ratio m, to the accumulation region ratio R(0) in a manifold in which the first taper parts 48a are not provided (m=0). In other words, the reduction α(m) of the accumulation region ratio is an index indicating the effect of accumulation region reduction provided by the first taper parts 48a. The reduction α(m) (unit: %) of the accumulation region ratio is calculated based on Equation 4.

$$\alpha(m) = -[1 - R(m)/R(0)] \times 100 \quad \text{Equation 4}$$

A variation θ(m) of the accumulation region ratio is an index indicating influence exerted by the dimension ratio m of a first taper part 48a upon a change of the accumulation region ratio R(m). The variation θ(m) (unit: degrees) of the accumulation region ratio is calculated based on Equations 5 and 6.

$$\varepsilon(m) = [\Delta R(m)/R(0)]/\Delta m \quad \text{Equation 5}$$

$$\theta(m) = \arctan(\varepsilon(m)) \quad \text{Equation 6}$$

In Equation 5, Δm is an amount of change of the dimension ratio m with respect to the dimension ratio m of a manifold in which the first taper parts 48a are not provided (m=0), so that Δm substantially corresponds to m. Also, ΔR(m) is a difference between the accumulation region ratio R(0) and the accumulation region ratio R(m). To equalize the upper limit of Δm and the upper limit of the variation θ(m) of the accumulation region ratio, each value is calculated so that the upper limit of the variation θ(m) becomes 1.

As shown in FIGS. 4 and 5, even with any dimension ratio m, providing the first taper parts 48a can reduce the accumulation region ratio R(m), compared to the case where the first taper parts 48a are not provided (m=0). Accordingly, it is understood that the first taper parts 48a can restrain the settling of an active material within the manifold 28. The flow rate of the coating material 18 is more likely to decrease in an end part than in a middle part of the manifold 28 in a first direction Y, so that the accumulation region tends to occur in an end part.

As the dimension ratio m becomes larger, the accumulation region ratio R(m) becomes smaller. Accordingly, only in terms of reduction of the accumulation region, the range in which a first taper part 48a extends is suitably wider. However, the flow rate difference ΔV(m) caused when the first taper parts 48a having the dimension ratio m greater than 0.4 are provided is larger than the flow rate difference ΔV (0) caused when the first taper parts 48a are not provided. When the flow rate difference ΔV(m) is larger, the thickness of an applied part 18a is more likely to become uneven. Therefore, in the coating device 1 according to the present embodiment, the dimension ratio m of each first taper part 48a is set to 0.4 or less to restrain increase in the flow rate difference ΔV(m).

The dimension ratio m of each first taper part 48a is also suitably 0.125 or greater. As described previously, since the accumulation region can be reduced by the first taper parts 48a irrespective of the magnitude of the dimension ratio m, the lower limit of the dimension ratio m is greater than zero (0<m). Meanwhile, as shown in FIGS. 4 and 5, when the dimension ratio m is 0.125 or greater, the reduction α(m) of the accumulation region ratio exceeds-80%. Thus, by setting the dimension ratio m to 0.125 or greater, the accumulation region can be reduced by 80% or greater, compared to the case where the first taper parts 48a are not provided. The inventor has ascertained that reduction of the accumulation region by 80% or greater is effective to make the thickness of an applied part 18a uniform.

Figure 6:
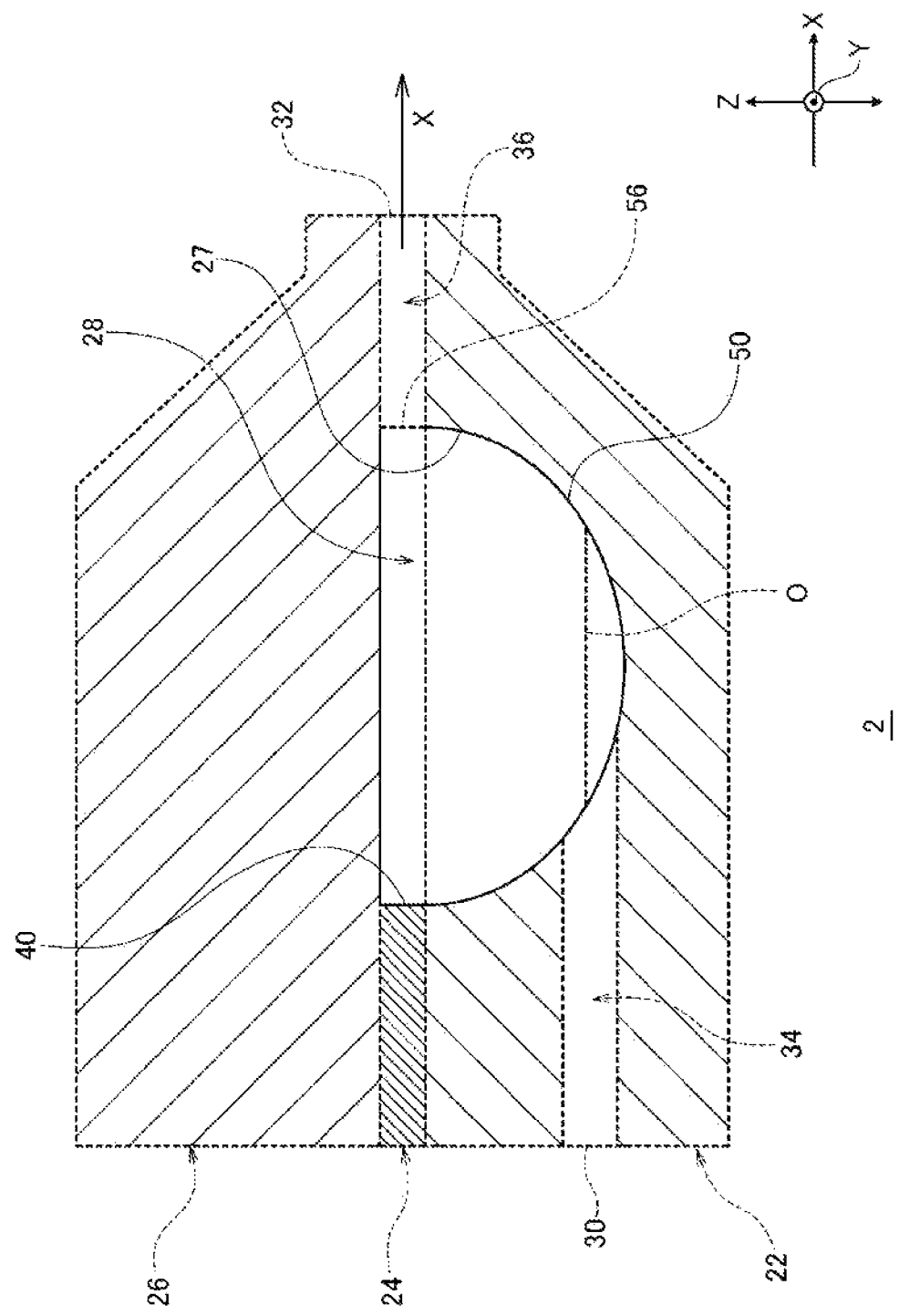
FIG. 6 is a schematic diagram that illustrates an outline of the manifold viewed from a first direction.

FIG. 6 is a schematic diagram that illustrates an outline of the manifold 28 viewed from a first direction Y. In FIG. 6, portions other than the manifold 28 are indicated by dotted lines, for the sake of convenience. The outline of the manifold 28 viewed from the first direction Y corresponds to an outer shape of the manifold 28 when the manifold 28 is projected onto an X-Z plane that includes the discharge direction X and a second direction Z.

In the present embodiment, the supply passage 34 and the discharge passage 36 are arranged such that the manifold 28 is located therebetween along the discharge direction X. Also, the supply passage 34 and the discharge passage 36 are connected to the manifold 28 such as to be shifted from each other in a second direction Z. Further, in the present embodiment, the supply port 30 and the discharge port 32 are also arranged such that the manifold 28 is located therebetween along the discharge direction X and such as to be shifted from each other in a second direction Z. The supply passage 34 extends parallel with the discharge direction X from the supply port 30 toward the manifold 28, and the discharge passage 36 extends parallel with the discharge direction X from the manifold 28 toward the discharge port 32. The discharge port 32 and the discharge passage 36 are arranged closer to the second block 26 than the supply port 30 and the supply passage 34 are.

The outline of the manifold 28 viewed from the first direction Y includes a curved part 50 that forms a convex toward the outside of the coating die 2, at least in a region that intersects an extended line O of the supply passage 34.

In other words, the curved part 50 forms a convex in a direction away from the center of the manifold 28 when viewed from a first direction Y. The extended line O is a virtual line extending parallel with the discharge direction X from a connection part between the manifold 28 and the supply passage 34. The center of the manifold 28 may be the geometrical center of the shape of the manifold 28 when viewed from a first direction Y, for example. With the curved part 50 provided, the coating material 18 flowing from the supply passage 34 into the manifold 28 can be smoothly led to the discharge passage 36. This can restrain the accumulation of the coating material 18, or settling of an active material. In the present embodiment, the entire wall surface of the recess 27 forms an arc shape. In other words, the entire wall surface of the recess 27 constitutes the curved part 50.

Figure 7:
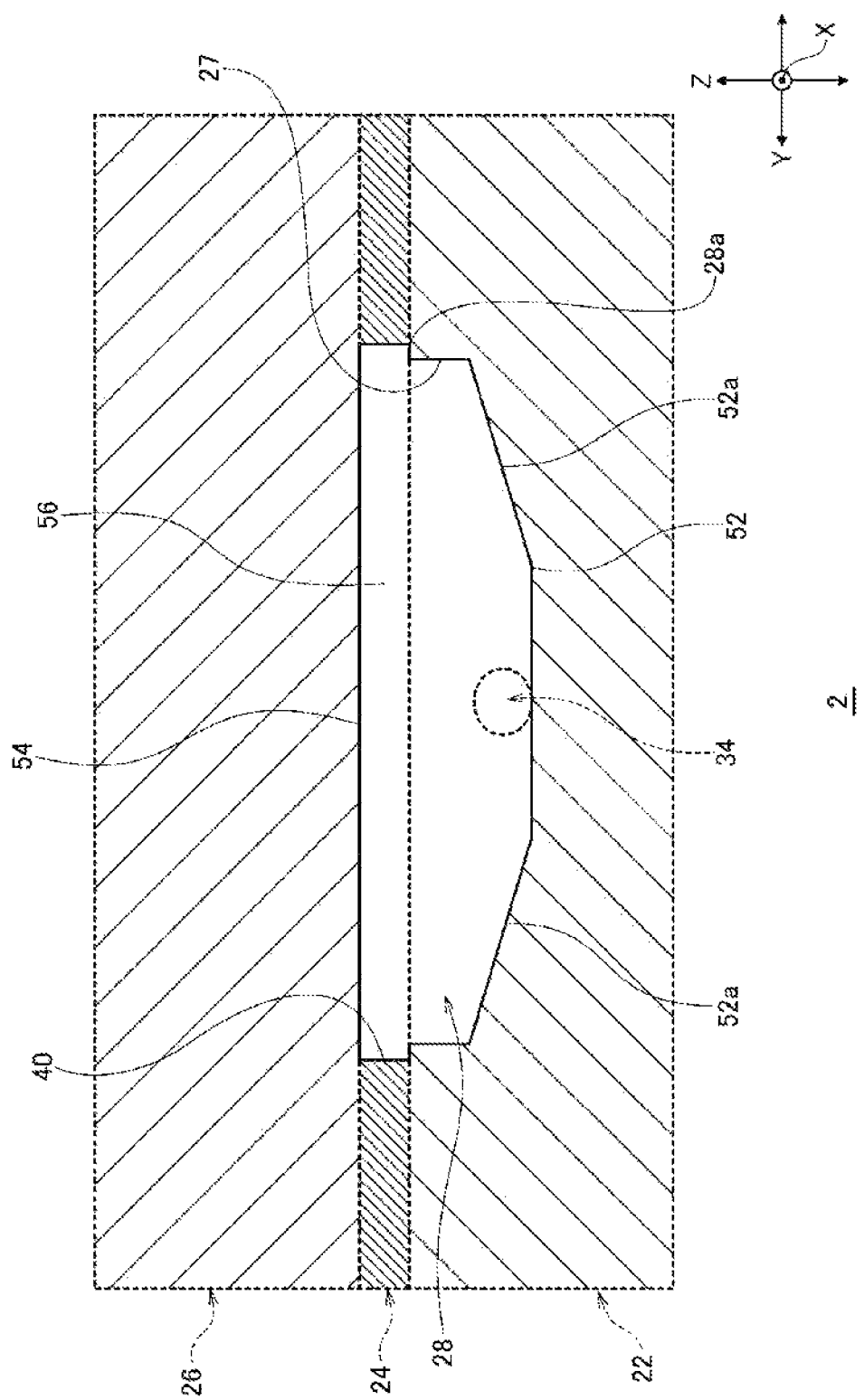
FIG. 7 is a schematic diagram that illustrates an outline of the manifold viewed from a discharge direction.

FIG. 7 is a schematic diagram that illustrates an outline of the manifold 28 viewed from the discharge direction X. In FIG. 7, portions other than the manifold 28 are indicated by dotted lines, for the sake of convenience. The outline of the manifold 28 viewed from the discharge direction X corresponds to an outer shape of the manifold 28 when the manifold 28 is projected onto a Y-Z plane that includes a first direction Y and a second direction Z.

In the present embodiment, the outline of the manifold 28 viewed from the discharge direction X includes a third outline part 52 and a fourth outline part 54 located opposite to each other in a second direction Z. The third outline part 52 and the fourth outline part 54 are arranged in a second direction Z. The third outline part 52 is constituted by the wall surface of the recess 27, and the fourth outline part 54 is constituted by the main surface of the second block 26. The third outline part 52 and a connection part 56 at which the discharge passage 36 is connected in the manifold 28 are shifted from each other in a second direction Z (see also FIG. 6).

The third outline part 52 includes, in an end region in a first direction Y, a second taper part 52a tilted to be closer to the connection part 56 in a second direction Z toward an end 28a of the manifold 28 in the first direction Y. In the present embodiment, the second taper part 52a is arranged at each of the both ends of the manifold 28 in a first direction Y. With the second taper parts 52a provided, the coating material 18 in the end parts of the manifold 28 in a first direction Y can be smoothly led to the discharge passage 36. This can restrain the accumulation of the coating material 18, or settling of an active material. When the dimension in a first direction Y from a connection part 34a at which the supply passage 34 is connected in the manifold 28 to an end 28a is set to 1, the dimension ratio m of a second taper part 52a in a first direction Y is suitably 0.4 or less and is also suitably 0.125 or greater.

The manifold 28 of the present embodiment has, at each end in a first direction Y, a shape obtained by combining the first taper parts 48a, the curved part 50, and the second taper parts 52a. In other words, the manifold 28 includes, at each end in a first direction Y, a shape of a truncated cone longitudinally split and horizontally laid. Further, the manifold 28 includes, in a middle part in a first direction Y, a shape of a cylinder longitudinally split and horizontally laid, which is constituted by the curved part 50. The shape of each end 28a along a first direction Y of the manifold 28 is a semicircular shape.

As described above, the coating die 2 of the present embodiment includes: the manifold 28 that temporarily stores the coating material 18; the supply port 30 through which the coating material 18 is supplied from the outside to the manifold 28; the discharge port 32 through which the coating material 18 is discharged from the manifold 28 toward the material 16 to be coated; the supply passage 34 that connects the supply port 30 and the manifold 28; and the discharge passage 36 that connects the manifold 28 and the discharge port 32.

The manifold 28, the discharge passage 36, and the discharge port 32 are longer in a first direction Y that intersects the discharge direction X. The outline of the manifold 28 viewed from a second direction Z that intersects the discharge direction X and a first direction Y includes the first outline part 46 to which the discharge passage 36 is connected and also includes the second outline part 48 located opposite the first outline part 46. The second outline part 48 includes, in an end region in a first direction Y, the first taper part 48a tilted to be closer to the first outline part 46 toward an end 28a of the manifold 28 in the first direction Y. When the dimension in a first direction Y from the connection part 34a at which the supply passage 34 is connected in the manifold 28 to an end 28a is set to 1, the dimension ratio m of the first taper part 48a in a first direction Y is 0.4 or less. Also, the coating device 1 of the present embodiment includes the coating die 2 including the abovementioned configurations, and the supply device 3 that supplies the coating material 18 to the coating die 2.

Thus, by providing the first taper part 48a in an end part in a longitudinal direction of the manifold 28 in a T-die of a straight manifold type, accumulation of the coating material 18 within the manifold 28 can be restrained, so that settling of an active material can be restrained. As a result, the thickness of the applied parts 18a can be made uniform, so that the performance of secondary batteries can be improved. Also, degradation in maintainability of the coating device 1 can be restrained.

In the present embodiment, the dimension ratio m of the first taper part 48a is 0.125 or greater. This can reduce the accumulation region more effectively, thereby restraining settling of an active material more certainly.

In the present embodiment, the supply passage 34 and the discharge passage 36 are arranged such that the manifold 28 is located therebetween and are connected to the manifold 28 such as to be shifted from each other in a second direction Z. Also, the outline of the manifold 28 viewed from a first direction Y includes the curved part 50 that forms a convex toward the outside of the coating die 2, at least in a region that intersects the extended line O of the supply passage 34. Accordingly, settling of an active material can be further restrained.

Also, in the present embodiment, the outline of the manifold 28 viewed from the discharge direction X includes the third outline part 52 and the fourth outline part 54 located opposite to each other in a second direction Z. The third outline part 52 and the connection part 56 at which the discharge passage 36 is connected in the manifold 28 are shifted from each other in a second direction Z. In an end region in a first direction Y, the second taper part 52a is provided such as to be tilted to be closer to the connection part 56 in a second direction Z toward an end 28a of the manifold 28 in the first direction Y. Accordingly, settling of an active material can be further restrained.

Also, in the present embodiment, the supply passage 34 is connected to a middle part in a first direction Y of the manifold 28, and the first taper part 48a is arranged at each of the both ends of the manifold 28 in a first direction Y. Accordingly, settling of an active material can be restrained in a wider range of the manifold 28.

An exemplary embodiment of the present disclosure has been described in detail. The abovementioned embodiment merely describes a specific example for carrying out the present disclosure. The embodiment is not intended to limit the technical scope of the present disclosure, and various design modifications, including changes, addition, and deletion of constituting elements, may be made to the embodiment without departing from the scope of ideas of the invention defined in the claims. Such an additional embodiment with a design modification added has the effect of the combined embodiment and modifications. In the aforementioned embodiment, matters to which design modifications may be made are emphasized with the expression of "of the present embodiment", "in the present embodiment", or the like, but design modifications may also be made to matters without such expression. Optional combinations of the abovementioned constituting elements may also be employed as additional aspects of the present disclosure. Also, the hatching provided on the cross sections in the drawings is not provided to limit the materials of the objects with the hatching.

In the embodiment, the recess 27 is provided only in the first block 22. However, the recess 27 may also be provided in the second block 26. In this case, the manifold 28 is formed by the recess 27 of the first block 22, the cutout part 40 of the spacer 24, and the recess 27 of the second block 26. Also, in this case, the recess 27 of the second block 26 may include the curved part 50.

When the second block 26 includes the recess 27, the wall surface of the recess 27 constitutes the fourth outline part 54. Accordingly, the fourth outline part 54 and the connection part 56 at which the discharge passage 36 is connected in the manifold 28 are shifted from each other in a second direction Z. In this case, the fourth outline part 54 may include, in an end region in a first direction Y, a second taper part tilted to be closer to the connection part 56 in a second direction Z toward an end 28a in the first direction Y. Further, the second taper parts may be provided both in the third outline part 52 and the fourth outline part 54, or may be provided in only one of them.

In the embodiment, the supply passage 34 extends in the discharge direction X to be connected to the manifold 28. However, the supply passage 34 may extend in a second direction Z to be connected to the manifold 28. Also, the supply port 30 and the supply passage 34 may be provided in the second block 26. Further, each of the first taper parts 48a and the second taper parts 52a may have a curved shape.

The invention claimed is:

1. A coating die used to apply a coating material onto a material to be coated, the coating die comprising:
    a manifold that temporarily stores the coating material;
    a supply port through which the coating material is supplied from the outside to the manifold;
    a discharge port through which the coating material is discharged from the manifold toward the material to be coated;
    a supply passage that connects the supply port and the manifold; and
    a discharge passage that connects the manifold and the discharge port, wherein
    the manifold, the discharge passage, and the discharge port are longer in a first direction that intersects a discharge direction of the coating material from the discharge port,
    an outline of the manifold viewed from a second direction that intersects the discharge direction and the first direction includes a first outline part to which the discharge passage is connected and also includes a second outline part located opposite the first outline part,
    the second outline part includes, in an end region in the first direction, a first taper part tilted to be closer to the first outline part toward an end of the manifold in the first direction,
    when the dimension in the first direction from a connection part at which the supply passage is connected in the manifold to the end is set to 1, dimension ratio of the first taper part in the first direction is 0.4 or less,
    the dimension ratio is in a range of 0.25 to 0.4, both 0.25 and 0.4 being inclusive,
    the supply passage and the discharge passage are arranged such that the manifold is located therebetween and are connected to the manifold such as to be shifted from each other in the second direction,
    an outline of the manifold viewed from the first direction includes a curved part that forms a convex in a direction away from the center of the manifold, at least in a region that intersects an extended line of the supply passage,
    an opening of the supply passage to the manifold is located opposite the curved part,
    an outline of the manifold viewed from the discharge direction includes a third outline part and a fourth outline part located opposite to each other in the second direction, and
    at least one of the third outline part or the fourth outline part and a connection part at which the discharge passage is connected in the manifold are shifted from each other in the second direction, and, in an end region in the first direction, a second taper part is provided such as to be tilted to be closer to the connection part at which the discharge passage is connected in the manifold, toward an end of the manifold in the first direction,
    the manifold includes, at each end in the first direction, a shape of a truncated cone longitudinally split and horizontally laid, which is obtained by combining the first taper part, the curved part, and the second taper part, and the manifold further includes, in a middle part in a first direction, a shape of a cylinder longitudinally split and horizontally laid, which is constituted by the curved part, and
    the shape of each end along the first direction of the manifold is a semicircular shape.

2. The coating die according to claim 1, wherein, when the dimension in the first direction from the connection part at which the supply passage is connected in the manifold to the end is set to 1, dimension ratio of the second taper part in the first direction is 0.4 or less.

3. The coating die according to claim 1, wherein
    the supply passage is connected to a middle part in the first direction of the manifold, and
    the first taper part is arranged at each of the both ends of the manifold in the first direction.

4. The coating die according to claim 1, wherein
    the material to be coated is a current collector of a secondary battery, and
    the coating material is electrode slurry of a secondary battery.

5. A coating device, comprising:
    the coating die according to claim 1 used to apply a coating material onto a material to be coated; and
    a supply device that supplies the coating material to the coating die.

6. The coating die according to claim 1, wherein an arc and a chord of the semicircular shape are arranged in the second direction.

* * * * *